United States Patent [19]

Larsen et al.

[11] 4,206,597

[45] Jun. 10, 1980

[54] FAN R.P.M. CONTROL LOOP STABILIZATION USING HIGH ROTOR SPEED

[75] Inventors: Hals N. Larsen, Redmond; Peter W. Kamber, Bellevue, both of Wash.

[73] Assignee: The Boeing Company, Seattle, Wash.

[21] Appl. No.: 679,594

[22] Filed: Apr. 23, 1976

[51] Int. Cl.$^2$ ............................ F02K 3/06; F02C 9/04
[52] U.S. Cl. .............. 60/226 R; 60/39.16 R; 60/39.28 R
[58] Field of Search .............. 60/226 R, 262, 39.16 R, 60/39.28 R, 39.28 T, 236

[56] References Cited

U.S. PATENT DOCUMENTS

| 3,523,423 | 8/1970 | Young | 60/39.16 R |
|---|---|---|---|
| 3,764,814 | 10/1973 | Griffith | 60/39.16 R |
| 3,854,287 | 12/1974 | Rembold | 60/39.16 R |
| 3,936,226 | 2/1976 | Harner et al. | 60/39.16 R |
| 3,982,389 | 9/1976 | Maker | 60/39.16 R |
| 4,040,250 | 8/1977 | Saunders et al. | 60/39.16 R |

*Primary Examiner*—Robert E. Garrett
*Attorney, Agent, or Firm*—Lynn H. Hess; B. A. Donahue

[57] ABSTRACT

A fan spool stabilization loop which improves the stability of the low speed or fan spool in a two spool turbofan engine. In a preferred embodiment, the actual rate of rotation of the high speed spool is compared with the desired rate of rotation determined by integrating the difference between the desired rate of rotation of the fan spool and the actual rate of rotation. The difference therebetween controls the flow of fuel to the turbofan engine. In an alternate preferred embodiment of the invention, the rate of change of rotation of the high speed spool is added to the actual rate of rotation of the fan spool and the result is compared with the desired rate of rotation of the fan spool. The difference therebetween is utilized to control the flow of fuel to the turbofan engine.

7 Claims, 3 Drawing Figures

U.S. Patent  Jun. 10, 1980  4,206,597
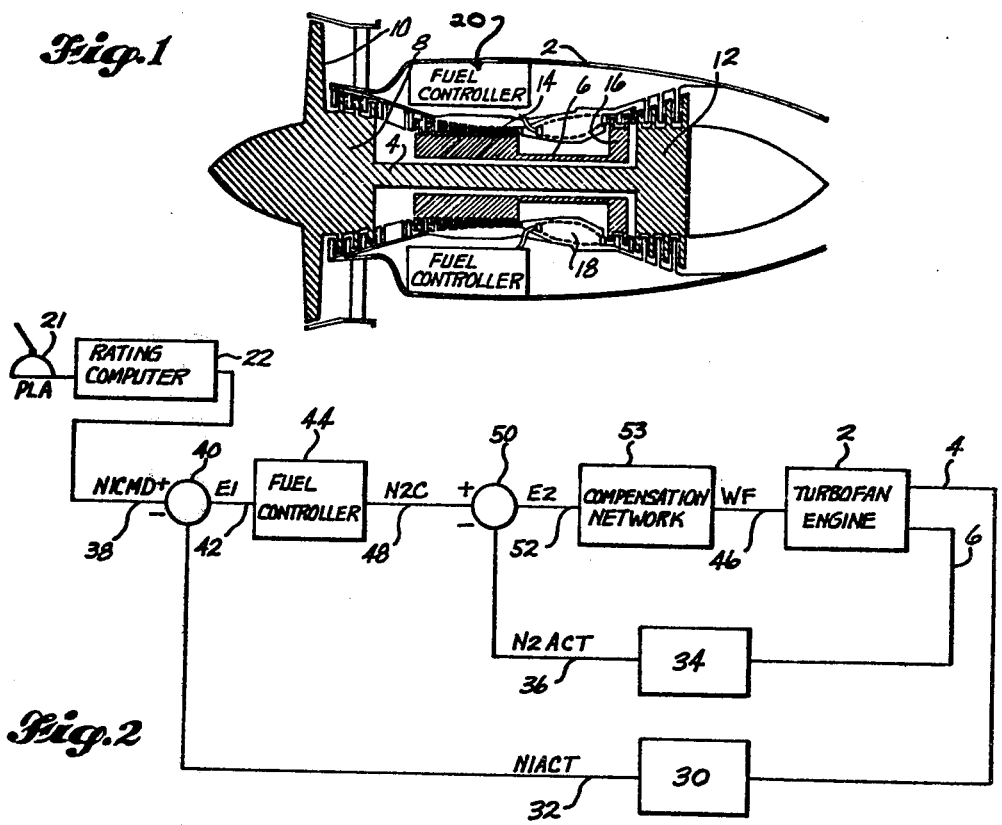
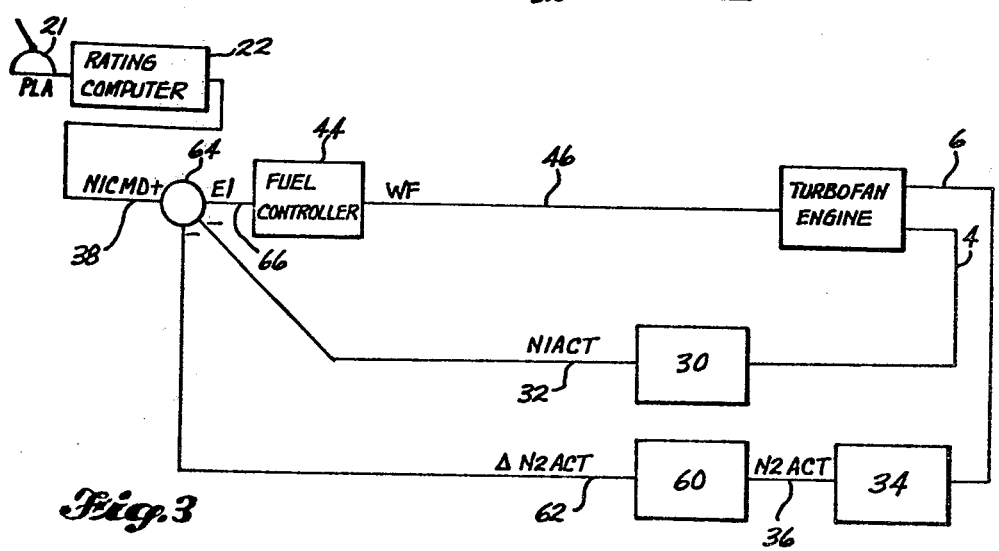

FAN R.P.M. CONTROL LOOP STABILIZATION USING HIGH ROTOR SPEED

FIELD OF THE INVENTION

This invention relates to a control system for a twin spool turbofan engine and particularly to apparatus for utilizing high speed spool RPM information to stabilize the low speed or fan spool control loop.

BACKGROUND

Prior efforts to achieve stabilization of a two spool turbofan engine have been accomplished by stabilization of the higher speed spool using high speed spool RPM as the controlling parameter. With the existence of the high by-pass ratio two spool engines, the low speed or fan spool RPM provides a parameter more closely related to engine thrust than the high speed spool RPM. Since requested changes in engine operation are usually indicative of desired changes in engine thrust, it becomes more advantageous to utilize the fan spool RPM as the controlling parameter to accomplish engine stabilization. However, because the inertia of the spool containing the fan is generally larger than the inertia of the high speed spool, it is more difficult to stabilize the fan spool RPM than to stabilize the high speed spool RPM.

To realize fan spool stabilization, current systems employ a control loop based upon an error signal proportional to the difference between the desired fan spool RPM and the actual fan spool RPM. Such error signal is then applied to a compensation network which in turn adjusts the fuel flow to the engine in such a manner as to minimize this error signal. These compensation networks generally consist of electronic components with gains and time constants that vary as a function of engine operating conditions.

The present invention is an improvement in two spool turbofan engine stabilization since the invention achieves fan spool RPM control with greater stability than that previously possible. Additionally, with this improvement, the fan spool may have sufficient stability such that the variable compensation networks may not be needed to maintain the desired spool stability.

SUMMARY OF THE INVENTION

This invention provides stabilization for the fan spool in a two spool turbofan engine. This is achieved by using high speed rotor RPM information as a damping source in the fan spool control loop. In one preferred embodiment, the fuel flow to the engine is adjusted in response to an error signal proportional to the difference between the actual rate of rotation of the high speed spool and a signal representing the desired rate of rotation of the high speed spool. Such desired signal is the integral of the difference between the actual rate of rotation of the fan spool and the desired rate of rotation of this spool.

In an alternative preferred embodiment of the invention, the fuel flow is adjusted in response to an error signal proportional to the difference between the desired rate of rotation of the fan spool and a signal which represents the sum of the actual rate of rotation of the fan spool and the rate of change of rotation of the high speed spool.

It is a primary object of this invention to provide greater stability for the fan spool in a dual spool turbofan engine.

BRIEF DESCRIPTION OF THE DRAWINGS

FIG. 1 is a schematic diagram of a two spool turbofan engine.

FIG. 2 is a schematic block diagram of the preferred embodiment of the present invention.

FIG. 3 is a schematic block diagram of an alternative embodiment of the present invention.

DESCRIPTION OF THE PREFERRED EMBODIMENT

Referring to FIG. 1, there is shown a typical high bypass ratio two spool turbofan engine 2 containing the high speed spool 6 and the fan spool 4. An integral portion of the fan spool 4 is the low pressure compressor 8 to which the fan 10 is attached. The low pressure compressor and fan, or the rotor portion of the fan spool, is driven by the fan turbine 12 to which it is connected by the low speed spool 4. The high pressure compressor 14, or the rotor portion of the high speed spool, is driven by the high pressure turbine 16 to which it is connected by high speed spool 6. A plurality of fuel burners 18 to which fuel is supplied by the fuel controller 20 is used to provide the required energy necessary to drive both the fan and high pressure turbines 12 and 16. The fuel controller, typically located within the engine, is a complex device which determines and controls the fuel flow rate to the burners 18.

This invention will be described in terms of a fully integrated electronic control system, although a hydromechanical control system or a hybrid approach consisting of hydromechanical and electronic control systems may be utilized to practice the invention.

FIG. 2 shows the preferred embodiment of the present invention. In the absence of any change in the power level angle setting 21, the engine 2 is in a steady state condition with the high speed spool 6 and the fan spool 4 rotating at constant rates. There is no fixed relationship between the rate of rotation of the high speed spool and the rate of rotation of the fan spool since these spools are acoustically coupled with each other. Means 30 responsive to the rotation of the fan spool 4 provides an electrical signal proportional to the actual rate of rotation of this spool, N1ACT, signal 32. Such means include magnetic pick-up devices used to sense the rotation of the fan blades, or alternately the use of a tachometer mounted on the fan spool. In a similar manner, means 34 responsive to the rotation of the high speed spool provides an electrical signal proporational to the actual rate of rotation of this spool, N2ACT, signal 36. These means include magnetic pick-up devices and tachometers as has been discussed.

Signal N1ACT is compared with an electrical signal N1CMD, signal 38, indicative of the desired fan spool rotation by the signal summing network 40. Network 40 is implemented with an operational amplifier although digital elements which perform add and subtract operations may be used. The N1CMD signal is provided by a rating computer 22 using the power level angle 21 as one of its inputs. The rating computer 22 is an electronic mini-computer which utilizes several engine and aircraft parameters including the PLA setting, engine inlet mach number, and engine ambient conditions to calculate the desired rotation of the fan spool.

Any change in the power level setting will initiate, via the rating computer, a desired change in N1CMD. The signal summing network 40 produces an output error signal E1, signal 42, which is proportional to the difference between N1ACT, the actual fan speed, and N1CMD, the desired fan speed. This error signal is applied to the input of the fuel controller 44.

Fuel controllers vary the engine thrust by controlling the fuel flow rate to the engine burners 18. The fuel flow rate establishes the energy available to the turbines 12 and 16. The energy available to the turbines will then determine the fan and high speed spool rates 32 and 36, respectively. For simplicity, the fuel controller is shown conceptually in the preferred embodiment as multiple units; however, in actuality, it is a single complex unit containing both hydromechanical and electronic components. The electronic components provide for the integration of input signal E1, signal 42, to produce output signal 48. Electronic or hydromechanical components are then used to perform the signal summing network 50 function producing signal 52, and to implement the compensation network 53 to produce WF signal 46.

In the preferred embodiment, the signal controlling the amount of fuel to engine 2, WF, signal 46, is determined by the transfer function of the fuel controller. Although the transfer function may be complex, in this embodiment the transfer function contains sufficient terms such that the output signal WF is the electronic integral of the input signal E1. In this manner, when the engine is in the steady-state condition, the resulting error signal 42 is a nulled DC signal and the integral of this signal N2C, signal 48, is a constant steady-state value.

Signal 48 represents the desired high speed spool rotation and is applied to the plus input of a second signal summing network 50. This network is implemented in a manner similar to network 40 as has been discussed. Applied to the minus input of this summing network is the electrical signal proporational to the actual rate of rotation of the high speed spool, signal 36, provided by the sensing means 34. This second summing network 50 compares the desired high speed spool rotational rate 48 with the actual high speed spool rotational rate 36 and produces an electrical signal E2, signal 52, proportional to the difference therebetween.

With the engine in steady-state operation, E2, the difference between actual high speed spool rotation and desired high speed spool rotation is a DC signal, which results in WF remaining at a constant DC value. Since WF is a stable value, the amount of fuel metered to the burners 18 remains constant such that both high speed and fan spools maintain stable rotation.

With a step change in the power level angle setting 21, N1CMD changes by a proportional amount. Since the engine was in a steady-state condition, N1ACT no longer equals N1CMD and a step change in the output error signal 42 is produced by signal summing network 40. Due to the step change in E1, the integrating effect of the transfer function within the fuel controller 44 produces a ramp like signal characteristic in N2C. Signal summing network 50 produces a similar ramp like error signal output 52 due to the stable rate in rotation, N2ACT, of the high speed spool. The scaling effect of the compensation network 53 produces an analogous proportional signal characteristic in WF which in turn causes an increase or decrease in the fuel flow to engine 2.

With an increase in fuel flow, both the high speed and fan spools increase their rotation to provide for the increased thrust requested by the change in the power level angle setting. The high speed spool, since it has less inertia than the fan spool, responds to changes in fuel flow quicker than the fan spool. As a result, N2ACT changes more rapidly than does N1ACT. The initial effect of this change is to reduce the error signal 52 produced by signal summing network 50 which in turn reduces WF, signal 46, controlling the primary flow of fuel to the engine.

As the fan spool increases rotation, N1ACT increases in a corresponding manner, thereby reducing error signal 42. The integrating effect of the fuel controller 44 transfer function on this reduced error signal provides a decrease in the slope of signal N2C. This decrease in the slope of the ramp like signal N2C, and the corresponding increase in the high speed spool rotation N2ACT tends to rapidly produce a nulled error signal 52 at the output of signal summing network 50. When the nulled error signal 52 is scaled by the compensation network 53, WF, the signal controlling the fuel supply to engine 2, becomes stable and the supply of fuel metered to the burners 18 is constant.

Signal WF becomes a constant, and the supply of fuel to the engine becomes stable only when the rate of rotation of the fan spool, N1ACT equals N1CMD. From the previous discussion, the effect of the inner high speed spool loop in the preferred embodiment is such that this loop anticipates the rate of change of the fan spool with the result that stabilization of the fan spool loop is rapidly accomplished.

FIG. 3 shows an alternate embodiment of the present invention. Again, with the engine in a steady-state condition, both high speed and fan spools are rotating at constant rates. As has been previously described, means responsive to the rotation of both spools, 30 and 34, provide electrical signals proportional to the actual rate of rotation of these spools, N1ACT signal 32, and N2ACT signal 36. Additional means 60 responsive to the rate of change of N2ACT provides $\Delta$N2ACT, signal 62, proportional to such rate of change. Such means include the use of an operational amplifier, or digital elements which provide add, subtract, and divide operations. When N2ACT is stable, its rate of change is zero, consequently $\Delta$N2ACT is a nulled signal. Signal 32, proportional to the actual rotation of the fan spool, and $\Delta$N2ACT are applied to the minus inputs of signal summing network 64. The signal proportional to the desired fan spool N1CMD rotation is applied to the plus input of the summing network. This signal is generated by the power level angle setting 21 and the rating computer 22 as has been previously described. Signal summing network 64 compares N1CMD with the sum of the N1ACT and $\Delta$N2ACT signals, and produces an error signal E1, signal 66, proportional to the difference therebetween. This error signal is applied to the input of fuel controller 44.

In the alternate embodiment of FIG. 3, the fuel controller 44 contains a transfer function which electronically integrates the input E1. Additional compensation of either an electronic or hydromechanical implementation may be needed to establish WF, signal 46. In steady-state operation, WF, the signal controlling the fuel flow to engine 2, is a constant, with the result that the fuel metered to the engine remains constant.

With any change in the power level angle setting 21, N1CMD changes a proportional amount. Since N1ACT and ΔN2ACT remain unchanged, signal summing network 64 produces a step change in E1 signal 66. This step change is integrated by the fuel controller 44 transfer function and a corresponding ramp change in WF results. The initial ramp change in WF produces a ramp change in the amount of fuel metered to the burners 18 with the result that both high and low speed spools change rotation accordingly.

The high speed spool, with its lower mass, reacts to such a ramp change faster than does the fan spool, consequently N2ACT and ΔN2ACT tend to anticipate or lead the fan spool in the step change in desired engine thrust. The rate of change of the high speed spool acts as a bias signal which, when added to a slowly increasing N1ACT signal by signal summing network 64, tends to minimize and smooth sudden changes in the error signal 66. The integrating effect of the fuel controller transfer function on the smoothed error signal produces an analogous characteristic in WF which results in the amount of fuel metered to the engine reaching a stable rate of flow, hence stabilization of both spools, in reduced time.

What is claimed is:

1. In a twin spool turbofan engine having a high speed spool and a fan spool, a control system for stabilizing changes in the thrust output of said engine, said control system comprising:

means for generating a first speed dependent signal as a function of fan spool speed of rotation;

means for generating a second speed dependent signal as a function of the high speed spool speed of rotation;

means for generating a first desired-speed signal indicative of a speed of fan spool rotation corresponding to a desired thrust output of said engine;

means for comparing said first speed dependent signal with said first desired-speed signal and producing therefrom a first error signal proportional to the difference therebetween;

means responsive to said first error signal for generating a second desired-speed signal indicative of the desired high speed spool speed of rotation;

means for comparing said second speed dependent signal with said second desired speed signal and producing therefrom a second error signal proportional to the difference therebetween; and means for adjusting the flow of fuel to said turbofan engine in response to said second error signal and thereby controlling the thrust output of said engine.

2. The control system of claim 1 wherein said means for generating a first speed dependent signal comprises a magnetic pick-up contained within said turbofan engine and a magnetic element contained within the fan blades of said fan spool such that said magnetic pick-up senses the revolution of the fan blades and produces a signal proportional to the rate therewith.

3. The control system of claim 1 wherein the means for generating a second speed dependent signal comprises a magnetic pick-up contained within said turbofan engine and a magnetic element contained within a gear assembly mounted upon said high speed spool such that said magnetic pick-up senses the revolution of said gear assembly and produces a signal proportional to the rate therewith.

4. The control system of claim 1 wherein said means for comparing said first speed dependent signal with said first desired-speed signal comprises an operational amplifier.

5. The control system of claim 1 wherein said means for generating a second desired-speed signal comprises an operational amplifier such that the output signal from said amplifier is the integral of the input signal to said amplifier.

6. The control system of claim 1 wherein said means for comparing said second speed dependent signal with said second desired speed signal comprises an operational amplifier.

7. The control system of claim 1 wherein said means for adjusting the flow of fuel to said turbofan engine comprises a torque motor adapted to control a fuel meter valve wherein said torque motor adjusts the fuel meter valve in response to said difference signal.

* * * * *